March 5, 1940.　　　R. A. GALBRAITH ET AL　　　2,192,286
TESTER FOR INSULATION TRACKING
Filed Oct. 6, 1938
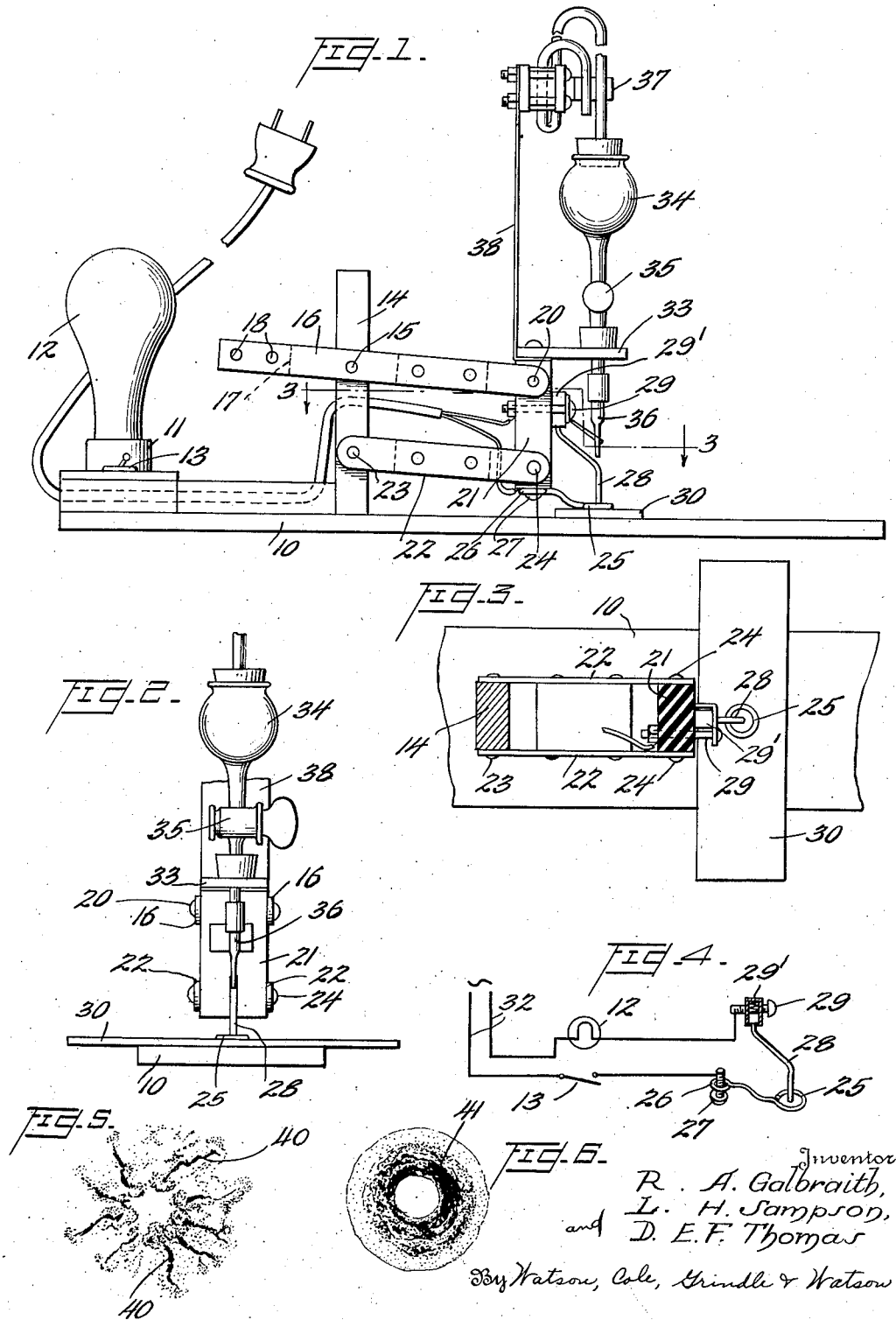
Inventors
R. A. Galbraith,
L. H. Sampson,
and D. E. F. Thomas
By Watson, Cole, Grindle & Watson
Attorneys Patented Mar. 5, 1940

2,192,286

UNITED STATES PATENT OFFICE 2,192,286

TESTER FOR INSULATION TRACKING

Ralph A. Galbraith, Leon H. Sampson, and David E. F. Thomas, Detroit, Mich., assignors to The Detroit Edison Company, Detroit, Mich., a corporation of New York Application October 6, 1938, Serial No. 233,694

19 Claims. (Cl. 175—183)

This invention relates to electrical testing methods and apparatus and particularly to methods of and apparatus for testing insulating materials for "tracking" or surface deterioration from electrical stresses.

It is a general object of the present invention to provide novel methods of and apparatus for quickly and simply testing insulation material for "tracking."

More particularly it is an object of the invention to provide methods for "tracking" tests of insulation material including the wetting with an electrolyte of the surface of the insulation being tested in the area between spaced electrodes bearing on said surface and in applying between said electrodes a potential sufficient to produce sparking in the electrolyte and determining whether or not sufficient current conductivity exists along the surface in a short space of time to indicate tracking.

Another object of the invention consists in the provision of apparatus for testing insulation material for tracking comprising a support movable above a base and carrying spaced electrodes and adapted to press them against the surface of the insulation to be tested, a source of current and current limiting and indicating means associated with the electrodes and means to supply an electrolyte onto the surface of the insulation in the space between the electrodes.

An additional object of the invention consists in the method of making tracking tests including the wetting of an area between electrodes with an electrolyte, the evaporation and breaking of the electrolyte film by the current flowing between the electrodes to produce an arc and the re-establishment of the film before the arc breaks by becoming too long, and measuring the current flow.

A further object of the invention consists in the provision of a method of making tracking tests of insulation material including the intermittent wetting of the surface with an electrolyte in the area between spaced electrodes bearing on the surface of the sample and in applying between said electrodes a potential sufficient to produce sparking in the electrolyte and/or arcing when the path thereof on the insulation is broken and limiting and measuring the current flow to determine whether or not tracking occurs.

A still further object of the invention consists in the provision of improved apparatus for testing insulating material for tracking characteristics comprising a base, a support movable always parallel to itself above said base, contacts carried by the support, concentrally arranged and provided with means to insure close engagement of said contacts with the surface of the sample to be tested and means for limiting and indicating current flow between said electrodes.

An important feature of the invention consists in the provision of means for closely regulating the non-continuous flow of electrolyte onto the surface of the sample being tested so that the film thereof is broken to produce arcing and closed before the arc becomes sufficiently long to break.

Another important feature of the invention resides in a provision of a ring-shaped electrode and a central electrode wherein the central electrode is offset a short distance above the surface of the sample to be tested, providing a clear path for the dropping of an electrolyte onto the electrode which leads the same without splashing to the surface of the sample.

Another important feature of the invention consists in effecting a tracking test between spaced electrodes by the use of an electrolyte containing a wetting agent as well as a conducting salt whereby even distribution of the liquid on the surface of the sample is maintained.

Other and further objects and features of the invention will be more apparent to those skilled in the art upon a consideration of the accompanying drawing and following specification, wherein are disclosed exemplary embodiments of the invention with the understanding that such changes may be made therein as fall within the scope of the appended claims without departing from the spirit of the invention.

In the drawing:

Figure 1 is a side elevation of apparatus for carrying out tracking tests according to the present invention;

Figure 2 is an end elevation thereof;

Figure 3 is a fragmentary horizontal section on broken line 3—3 of Figure 1, looking down;

Figure 4 is a circuit diagram;

Figure 5 shows the results of a test on a synthetic plastic insulation subject to tracking; and Figure 6 shows the results of a test on another synthetic plastic insulation not subject to tracking.

Insulating parts, and particularly those used for circuit breakers, bushings, switch bases and the like, are usually formed of fibrous material, plastic compositions or the like, and often fail in service although they may have successfully passed the usual physical, mechanical and electrical tests. It has been recognized that there are some properties of these materials which have not been carefully examined and which are essential to their successful operation under severe conditions.

One important test is for the determination of the ability of an insulating material to resist that type of surface deterioration which has been designated by the term "tracking." For the purpose of this specification, tracking may be considered as that type of damage in which, by decomposition, permanent filaments or paths of higher electrical conductivity than the rest of the surrounding insulating material are formed in the surface layer. Certain of the synthetic resins are particularly subject to tracking, and this condition cannot always be determined by previously known arcing tests or high voltage tests of one type or another.

The present invention includes methods of and apparatus for carrying out tests by means of which some of the tracking characteristics of insulating materials may be readily determined. The methods can be carried out with simple apparatus of most any suitable design, although that later to be described is preferable. Briefly it comprises two concentric circular electrodes connected across a source of 120 volts alternating current in series with a 100 watt, 120 volt lamp and so arranged that the electrodes can be pressed against the surface of the material to be tested. An electrolyte drop feeding system is mounted above the electrodes to drop a suitable electrolyte at a predetermined rate onto the surface of the material being tested in the space between the electrodes.

The methods are designed to obtain decomposition of the surface of the insulating material through sparking and/or arcing obtained by a periodically broken electrolytic film between the two electrodes on the surface of the sample. Those materials which track will tend to form the conducting filaments or tracks previously mentioned, whereas the other materials, while showing surface damage, will not show the dendritic tracks. The rate of dropping of the electrolyte is preferably so adjusted that the film thereof on the surface of the tested material is broken by evaporation resulting from the sparking and/or arcing and current carried thereby just prior to the fall of the next drop. Alternating current is preferred, for unidirectional current produces electrolysis and conducting paths of metallic salts from the electrolyte may be deposited on the surface of the insulating material which interfere with the test.

The principle of operation involves the discontinuous or intermittent wetting of the surface of the insulating material to be tested rather than a continuous wetting thereof. The film of electrolyte provided on the surface of the test sample should be broken for as short periods as possible since the purpose in the tracking tests is to break the conducting path between the electrodes at any one point to provide an arc of minute length. The temperature induced in the material by this arc tends to decompose it. Were the rate of electrolyte flow to be decreased so that the gap could become wide enough to break the arc not only would the test time be prolonged, but a certain amount of the heat created by the arc would be lost. If the arc and the temperature which it creates are going to result in the deterioration of the surface of the material, this fact is desired to be known as quickly as possible and hence any cooling of the material as might occur were the gap to widen to the point where the arc would fail is to be avoided. For this reason it is desired to add another drop of electrolyte almost immediately after there has been formed a gap in the film resulting from the previous drop. In this way there is periodically created a small arc somewhere on the tested surface.

The rate of dropping subsequently referred to has been found satisfactory with the particular potential suggested applied to electrodes of the form and size shown. It may be that with certain materials the electrolyte dropping rate may require adjustment because of the more or less rapid current flow on their surfaces.

Referring now to the drawing for a disclosure of a preferred form of the apparatus, there is shown at 10 any suitable base for the apparatus, preferably insulating material, having mounted at one end thereof a socket 11 for an electric lamp 12 and a small switch 13. Near the center of the base is a vertical upright 14 forming a post for supporting the remaining portions of the apparatus. Pivoted at 15 to either side of the post is a pair of straps 16, extending forwardly and rearwardly of the post as shown. These straps are connected together to the rear of the post by means of a block 17 and suitable fastening elements 18. This block may serve as a handle which on being pressed down lifts the forward ends of the straps. It may also serve as a counterweight. The forwardly extending portions of the straps 16 support, by means of the pivot 20, the block 21 of insulation. To insure that this block moves in a substantially vertical path and is maintained upright at all times, a second set of straps 22 is arranged parallel to the set 16 and pivoted respectively at 23 and 24 to the post and block 21.

This block forms the carrier for the testing electrodes. The outer or ring-shaped electrode 25 extends from an integral stem and eye 26 which is attached by a screw 27 against the lower face of the block 21. The central electrode 28 has a lower vertical portion and an inclined offset portion. It may be directly secured to the front face of the block 21 by a fastening means such as the bolt 29 passing through an integral eye on the upper vertical portion of the electrode.

It has been found by a series of tests that the ring and central circular pin form the best electrodes, although other types may be used, such as spaced rods, washers, straps or the like. The circular electrode, however, holds the electrolyte in position, is uniformly spaced from the central electrode, and completely encloses the electric field. The electrodes are best made of stainless steel wire or rod approximately 0.1 inch in diameter with the outer electrode in the form of a ring approximately 0.5 inch in mean diameter.

Added refinements in the mounting of the electrodes may consist in a spring support for the central electrode so that when the outer electrode rests on the insulation 30 to be tested as seen in Figure 1, the central electrode is insured of being pressed tightly down onto the surface of the material. This can be effected by a tubular sleeve 29' of non-circular form, housing a coil spring, and secured in position by the bolt 29. The spring may bear on a piston slidably mounted in the tube and carrying the electrode. This construction insures centering the two electrodes. Likewise, the ring-shaped electrode may be mounted in a universal manner so that it assured of bearing with its whole circumference over the surface of the insulating material. The mounting of the insulation block 21, however, insures the undersurface of the ring being always parallel to the base so that samples of uniform thickness can be successfully tested.

Figure 4 shows the circuit arrangement with the source of alternating current 32, the lamp 12, the electrodes 25 and 28 and the switch 13 being in a series, so that an electrostatic field exists between the electrodes.

A supporting plate 33 may be attached to the upper end of the block 21 to carry the means for holding and feeding the electrolyte. It may conveniently consist of a thistle tube 34 with a stopcock 35 and a nozzle 36 which is arranged to be in direct alignment with the main portion of the central electrode 28 whereby the liquid is dropped onto this electrode and runs down onto the surface of the sample without splashing. The thistle tube may also be equipped with an added refinement in the nature of a variable high ratio capillary valve 37 supported on the strap 38.

The electrolyte developed after a series of careful tests is preferably a solution of Nekal BX, sodium nitrate and water in substantially the proportions of 1:12:200 by weight. Nekal BX is a "wetting agent" used in the textile industry and is potassium napthene sulfonic acid.

The procedure found to be most desirable in carrying out the tests is first to insure that the sample 39 which rests on the base 10 receives good contact from both electrodes and then to allow four drops of the electrolyte to fall on the sample, spreading the same with a glass rod if necessary so that the whole surface of the material between the electrodes is completely covered. The switch 13 is then closed, the rate of dropping of the electrolyte having previously been adjusted to approximately 18 drops per minute. If the material being tested is one which tracks, the time to failure of the insulating surface, as indicated by the lighting of the lamp 12, is recorded for ten different trials and the rating of the material is then based on the average of values of time obtained in these trials. If the material is non-tracking, the test is continued only to the point where it is evident that failure of the surface will not occur.

The lamp is used as a current limiting resistor and an "end point" indicator. In addition to the indication by the lighting of the lamp, the tracking or non-tracking of the material may be determined by visual inspection of the surface during and following the test. The materials which track show a characteristic growth of reddish hot filaments on the surface during the test. They may be considered as dendritic paths of conducting material. Materials of the group which do not track are damaged on the surface, but show no tendency to form conducting tracks. Figure 5 shows the result of a test on a material which "tracks" as evinced by the radial surface rupture lines 40. In Figure 6 is seen the result of a test on a "non-tracking" sample. The surface damage 41 by burning is clearly seen, but no radial tracks are present so that there is no substantial conductivity between the electrodes on the surface.

While specific sizes of electrodes, potential of testing current, wattage of lamp and composition of the electrolyte have been indicated, they are in no wise critical but have been found as convenient as any for general usage.

The concentric ring and center electrodes are convenient for several reasons. Most of the electrolyte is confined between the two electrodes and the small amount which may escape beyond the ring has no effect since it is outside the electrical field. The field is confined and symmetrical so that the results obtained are more nearly uniform than with the other types of electrodes. Obviously the diameters of the wire used and of the outside ring can be selected in accordance with the voltage and the electrolyte which may be desired.

Various voltages of alternating potential can be used but voltages above 120 only produce an increased severity of sparking and since sufficient is obtained with 120 volts, it is considered the most desirable since readily available.

The size of the lamp was selected to limit the current to a reasonable amount under severe conditions of sparking and tracking and to give a convenient indication of excess current flow.

The electrolyte suggested has been found satisfactory after considerable experimentation, but obviously is not the only one or the only concentration which can be used. It was found to flow evenly on the surface without much spluttering and could be used with a lower voltage than certain others tested. The absence of such ingredients as chlorine and the like is found advantageous since corrosive agents might affect the surface of the sample. The conductivity of sodium nitrate is such that with moderate concentrations sufficient current flow is obtained. The evaporation rate is satisfactory and is found to be right with the dropping rate of about 18 per minute.

The tracking test and the apparatus is characterized by its simplicity. The equipment used is portable, inexpensive, and operates on the generally available 120 volt alternating current source. It can easily be taken into the field for testing insulating materials in equipment already built, providing the surface which it is desired to test is in a horizontal position and is of a suitable shape. The test may be performed in a short time and no special skill or training is needed by the operator.

Having thus described the invention, what is claimed as new and desired to be secured by Letters Patent is:

1. The method of testing insulation for "tracking" comprising passing a current through a film of electrolyte on the surface of said insulation between spaced electrodes engaging the surface and noting changes in current flow.

2. The method of testing insulation for "tracking" comprising wetting the material with an electrolyte, engaging the wetted surface with spaced electrodes, passing a curent between said electrodes and noting changes in current flow.

3. The method of testing insulation for "tracking" comprising intermittently wetting the surface of the material with an electrolyte between spaced electrodes, applying a source of potential to said electrodes to evaporate the electrolyte and noting the time interval elapsing until the current flow increases substantially.

4. The method of testing insulation for "tracking" comprising contacting the surface of the insulation with spaced electrodes, wetting the area between the electrodes with an electrolyte, applying a potential to said electrodes to evaporate the film, re-establishing said film of electrolyte in said area at intervals and noting changes in current flow between said electrodes.

5. The method of testing insulating material for "tracking" comprising intermittently maintaining the surface of the material covered with a film of electrolyte containing a wetting agent, establishing a current through the film of electrolyte sufficient to evaporate the same and noting changes in the current flow.

6. The method of testing insulating material for "tracking" comprising periodically covering the surface of the material with a film of electrolyte containing a wetting agent, establishing a current through the film of electrolyte of sufficient intensity to produce sparking therein and noting changes in the current flow.

7. The method of testing insulation for "tracking" comprising contacting spaced electrodes with the surface of said material, wetting the area between said electrodes, establishing a current flow between said electrodes to evaporate the electrolyte to provide a dry gap for arcing, feeding electrolyte to said area at such a rate as to prevent complete dryness and noting the current flow.

8. The method of testing insulating material for "tracking" comprising intermittently covering the surface of the material with a film of electrolyte within a ring electrode engaging the surface, passing a current between said electrode and a concentric center electrode to evaporate the film and produce arcing and noting changes in current flow between said electrodes.

9. The method of testing insulation for "tracking" comprising passing a current through a film of a solution of sodium-nitrate on the surface of said insulation between spaced electrodes engaging the surface and noting changes in current flow.

10. The method of testing insulation for "tracking" comprising passing a current through a film of a solution of sodium-nitrate and a wetting agent on the surface of said insulation between spaced electrodes engaging the surface and noting changes in current flow.

11. Apparatus for testing insulation for "tracking" comprising in combination, a pair of spaced electrodes, means insulating and supporting said electrodes for contact with the surface of insulation to be tested, means to supply electrolyte to the area of insulation between said electrodes and a source of alternating current for connection to said electrodes.

12. Apparatus for testing insulation for "tracking" comprising in combination, a pair of spaced electrodes of stainless metal, means insulating and supporting said electrodes for contact with the surface of insulation to be tested, means to supply electrolyte to the area of insulation between said electrodes and a source of alternating current for connection to said electrodes.

13. Apparatus for testing insulation for "tracking" comprising in combination, a pair of spaced electrodes, means insulating and supporting said electrodes for contact with the surface of insulation to be tested, means to supply electrolyte to the area of insulation between said electrodes, a current indicator and a source of alternating current for series connection to said electrodes.

14. Apparatus for testing insulation for "tracking" comprising in combination, a ring-shaped contact block, a concentric center contact extending through said ring, means insulating and supporting said contacts whereby both contacts may be brought into engagement with the surface of material to be tested, a base for supporting said material and a "parallel motion" support for said means carried by said base.

15. Apparatus for testing insulation for "tracking" comprising in combination, a ring-shaped contact block, a concentric center contact extending through said ring, means insulating and supporting said contacts whereby both contacts may be brought into engagement with the surface of material to be tested, one of said contacts being spring pressed to insure engagement of both with a surface to be tested and a liquid dropper mounted on said means.

16. Apparatus for testing insulation for "tracking" comprising in combination, a base, a block of insulation mounted for movement above said base and always parallel to its initial position, a ring-shaped electrode and a central electrode extending from said block over said base to both engage insulation resting thereon and means to supply electrolyte intermittently into the space between said electrodes.

17. Apparatus for testing insulation for "tracking" comprising in combination, a base, a block of insulation mounted for movement above said base and always parallel to its initial position, a ring-shaped electrode and a central electrode extending from said block over said base to both engage insulation resting thereon, a lamp carried by said base, means to connect said electrodes and lamp in series with a source of current and means to supply electrolyte to the surface of the insulation within the ring electrode.

18. A tester of the type described including, in combination, a base, a block of insulation articulated to said base, a ring and central contact extending from said block to rest on the surface of an insulation sample on said base, a reservoir for electrolyte, a dropper for said electrolyte and means to deliver the drops onto the central electrode to be fed to the area within the ring without splashing.

19. A tester of the type described including, in combination, a base, a block of insulation articulated to said base, a ring and central contact extending from said block to rest on the surface of an insulation sample on said base, a reservoir for electrolyte, a dropper for said electrolyte and means to deliver the drops onto the central electrode to be fed to the area within the ring without splashing, and a variable, high-ratio capillary valve for regulating the flow from said reservoir.

RALPH A. GALBRAITH.
LEON H. SAMPSON.
DAVID E. F. THOMAS.